United States Patent
Umeuchi et al.

(10) Patent No.: US 8,619,709 B2
(45) Date of Patent: Dec. 31, 2013

(54) ACCESS POINT SCAN METHOD, STORAGE MEDIUM STORING SCAN PROGRAM, AND STATION

(75) Inventors: Makoto Umeuchi, Yokosuka (JP); Takefumi Hiraguri, Yokosuka (JP); Tomohiro Tokuyasu, Yokosuka (JP); Toshihiro Manabe, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 399 days.

(21) Appl. No.: 12/746,782

(22) PCT Filed: Dec. 12, 2008

(86) PCT No.: PCT/JP2008/072662
§ 371 (c)(1),
(2), (4) Date: Jun. 8, 2010

(87) PCT Pub. No.: WO2009/078358
PCT Pub. Date: Jun. 25, 2009

(65) Prior Publication Data
US 2010/0265885 A1 Oct. 21, 2010

(30) Foreign Application Priority Data
Dec. 18, 2007 (JP) .................. 2007-325386

(51) Int. Cl.
*H04W 4/00* (2009.01)

(52) U.S. Cl.
USPC ............ 370/331; 370/310; 370/311; 370/328

(58) Field of Classification Search
USPC .................. 370/331, 328, 311, 310
See application file for complete search history.

(56) References Cited

U.S. PATENT DOCUMENTS

| | | | |
|---|---|---|---|
| 2006/0014537 A1* | 1/2006 | Arai et al. ................ | 455/435.1 |
| 2007/0123254 A1 | 5/2007 | Choi et al. | |
| 2007/0263558 A1 | 11/2007 | Salomone | |
| 2009/0068970 A1* | 3/2009 | Ahmed et al. ............ | 455/161.1 |

FOREIGN PATENT DOCUMENTS

| | | |
|---|---|---|
| JP | 11-331916 A | 11/1999 |
| JP | 2885789 B | 11/1999 |
| JP | 2007-306510 A | 11/2007 |

OTHER PUBLICATIONS

IEEE 802.11 Std. "11.1.3.1 Passive Scanning & 11.1.3.2 Active Scanning", p. 422, 2007.

* cited by examiner

*Primary Examiner* — Omer S Mian
(74) *Attorney, Agent, or Firm* — Harness, Dickey & Pierce, P.L.C.

(57) ABSTRACT

In an access point scan method by which a station disconnected from an access point scans for a next access point to which the station can be connected at a predetermined scan interval, the station sets a shorter scan interval when a possibility of connection to the next access point to which the station can be connected is presumed to be high or a need for connection is presumed to be great, and sets a longer scan interval when the possibility of connection is presumed to be low or the need for connection is presumed to be small, based on one of information on the access point to which the station being connected just before disconnection and information on the station.

9 Claims, 9 Drawing Sheets

SCAN INTERVAL TABLE    13-2

| SSID | SCAN INTERVAL (sec) |
|------|---------------------|
| SSID #1 | $1 \times m$ |
| SSID #2 | $10 \times m$ |
| SSID #3 | $10 \times 2^m$ |
| SSID #4 | 300 |

(NUMBER m OF SCANS m ≧ 1)

SCAN INTERVAL TABLE  13-2

| NETWORK ADDRESS OF SUBNET | SCAN INTERVAL (sec) |
|---|---|
| 192.168.1.x | 1 |
| 192.168.2.x | 10 |
| 192.168.3.x | 60 |
| 192.168.4.x | 300 |

Fig. 12

SCAN INTERVAL TABLE  13-2

| SERVICE AREA | SCAN INTERVAL (sec) |
|---|---|
| OUT OF SERVICE AREA | 1 |
| WITHIN SERVICE AREA | 10 |

Fig. 13

SCAN INTERVAL TABLE  13-2

| APPLICATION INFORMATION | SCAN INTERVAL (sec) |
|---|---|
| TELEPHONY APPLICATION | 1 |
| VIDEO APPLICATION | 10 |
| BROWSER | 60 |
| MAIL | 300 |

ACCESS POINT SCAN METHOD, STORAGE MEDIUM STORING SCAN PROGRAM, AND STATION

CROSS REFERENCE TO RELATED APPLICATION

This application is a U.S. National Stage application claiming the benefit of prior filed International Application Number PCT/JP2008/072662, filed on Dec. 12, 2008, in which the International Application claims priority from Japanese Patent Application Number 2007-325386, filed on Dec. 18, 2007, the entire contents of which are incorporated herein by reference.

TECHNICAL FIELD

The present invention relates to an access point scan method, a scan program, and a station that allow a station which is disconnected from an access point to scan for a next access point to which the station can be connected in a wireless LAN system.

BACKGROUND ART

Conventionally, a station (hereinafter referred to as a STA) connected to an access point (hereinafter referred to as an AP) of a wireless LAN system has been disconnected from the AP when moving out of the service area where the STA is out of communication with the AP. Therefore, the STA starts to scan for a next connectable AP. In IEEE 802.11 Std., two types of scan methods by which a STA scans for an AP are prepared (see non-patent document 1).

In passive scanning described in "11.1.3.1 Passive scanning" in IEEE 802.11 Std., a STA monitors to a beacon which is transmitted from an AP for each wireless channel during a certain period, and thereby scans for the existence of an AP. Furthermore, in active scanning described in "11.1.3.2 Active scanning" in IEEE 802.11 Std., a STA transmits a frame called a probe request for each wireless channel, and, when a response called a probe response is sent back from an AP, the STA recognizes the existence of an AP.

Figure 1:
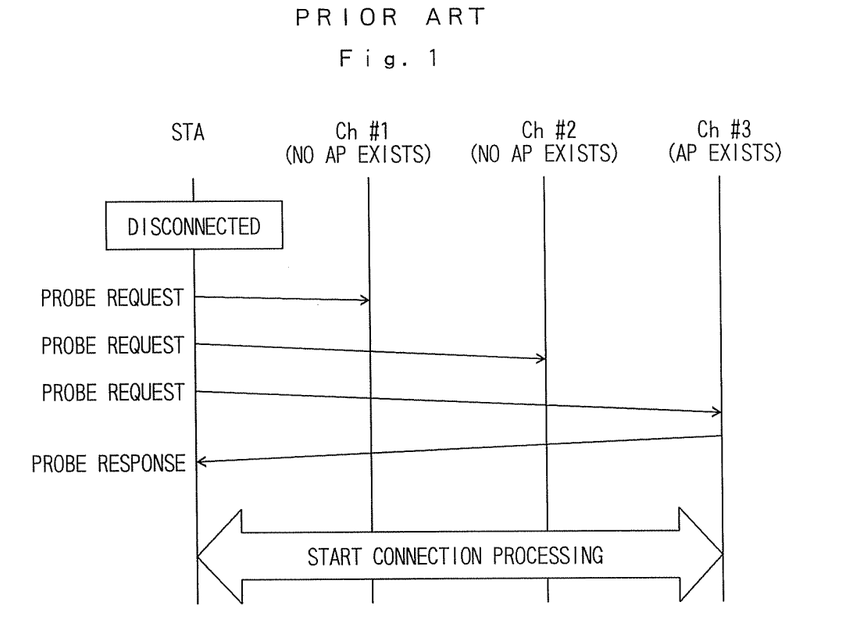
FIG. 1 is a diagram showing an example of a sequence of the existing AP scan by active scanning.
Figure 2:
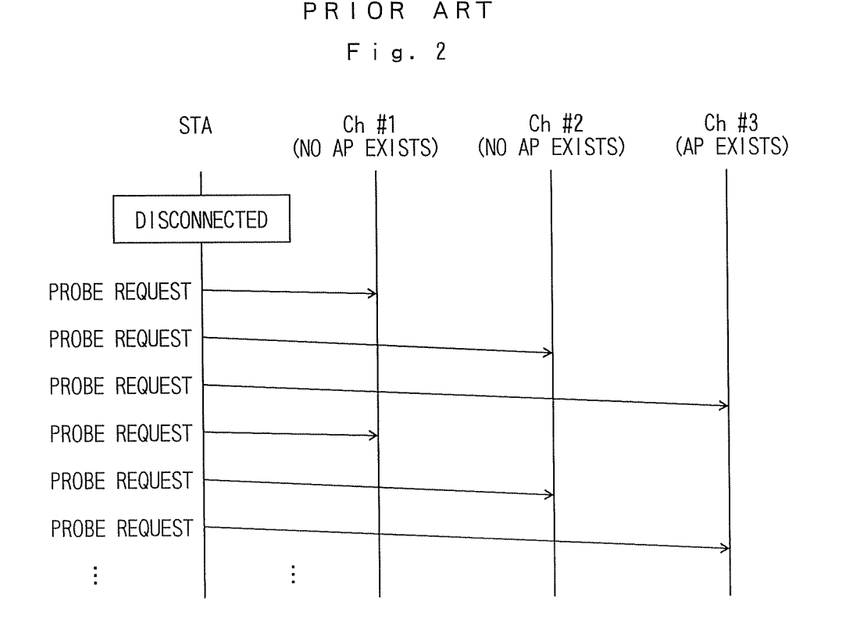
FIG. 2 is a diagram showing another example of a sequence of the existing AP scan by active scanning.

As an example of an AP scan, a sequence of an AP scan by active scanning is shown in FIGS. 1 and 2.

In FIG. 1, a STA disconnected from the AP transmits probe requests sequentially to channel number (Ch#) 1 to Ch#3, for example. In FIG. 1, a connectable AP in Ch#3 sends a probe response, and the STA starts processing to establish connection to the AP using Ch#3. On the other hand, in FIG. 2, none of Ch#1 to Ch#3 includes a connectable AP, and so the STA repeatedly transmits probe requests to each of the channels until the STA connects to an AP.

As described above, in the existing AP scan method adopted by a STA, a STA which is not connected to an AP continues scanning until the STA finds an AP, and immediately starts connection processing when the STA finds a connectable AP.

Figure 3:
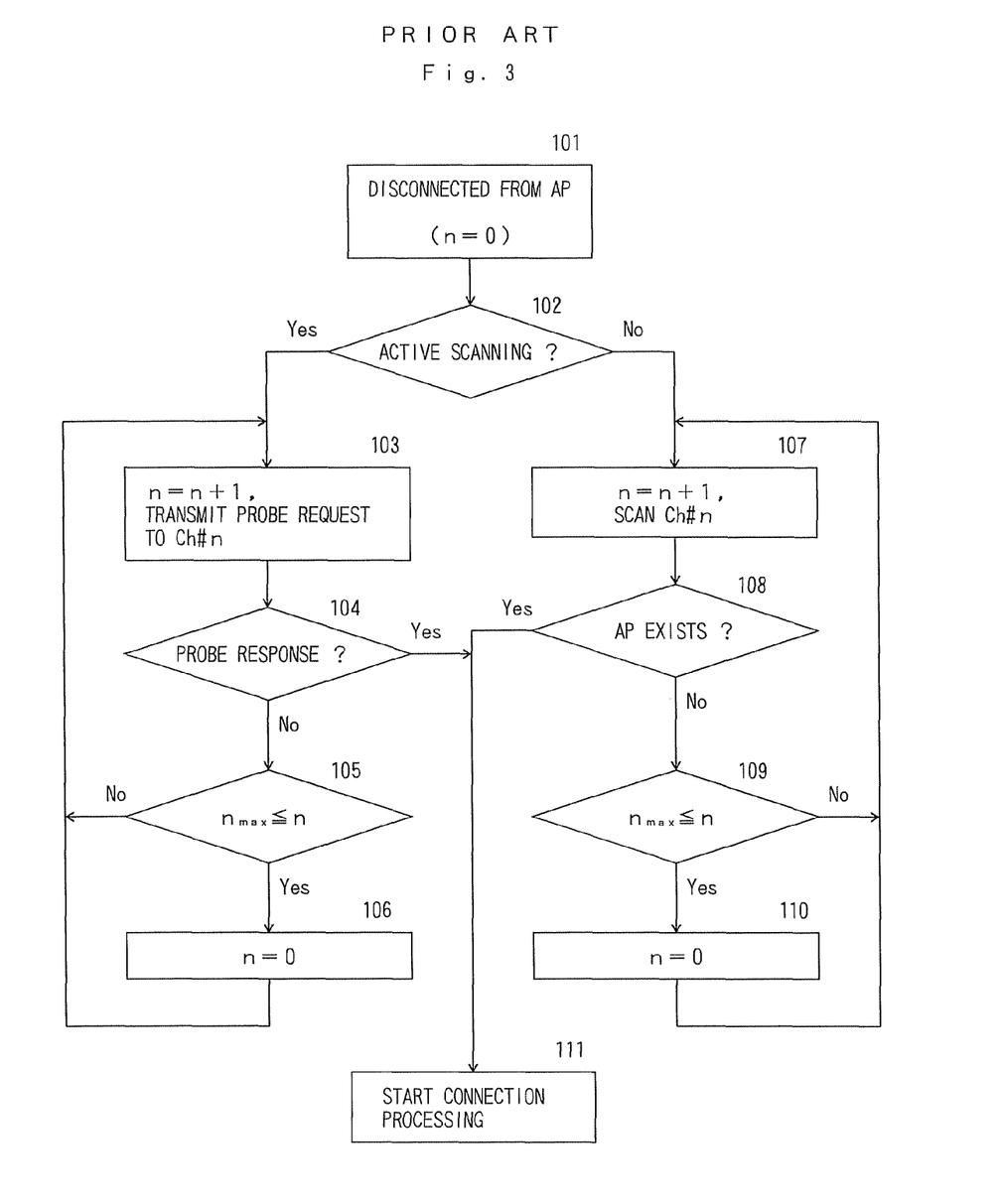
FIG. 3 is a flowchart showing the existing procedure by which a STA scans for an AP to which the STA can be connected.

FIG. 3 is a flowchart showing the existing procedure by which a STA scans for an AP to which the STA can be connected. Incidentally, in FIG. 3, the initial value of a channel number n is 0, and $n_{max}$ is the maximum value of the channel number.

First, when the STA is disconnected from the AP (step 101), the STA decides between active scanning and passive scanning (step 102).

When active scanning is performed, the STA adds 1 to n, and transmits probe requests sequentially to Ch#1 to Ch#$n_{max}$ (step 103 to step 105). When a connectable AP exists in any one of Ch#1 to Ch#$n_{max}$ and a probe response is sent back from the AP ("Yes" in step 104), the STA starts processing to establish connection to the AP using the channel (step 111).

Furthermore, when no connectable AP is found to exist after the STA transmits the probe requests sequentially to Ch#1 to Ch#$n_{max}$, the STA resets n to 0 (step 106), goes back to step 103, and repeats the AP scan until the STA connects to an AP.

When passive scanning is performed, the STA adds 1 to n, and sequentially scans Ch#1 to Ch#$n_{max}$ (step 107 to step 109). When a connectable AP exists in any one of Ch#1 to Ch#$n_{max}$ ("Yes" in step 108), the STA starts processing to establish connection to the AP using the channel (step 111).

Furthermore, when no connectable AP is found to exist after the STA sequentially scans Ch#1 to Ch#$n_{max}$, the STA resets n to 0 (step 110), goes back to step 107, and repeats the AP scan until the STA connects to an AP.

Non-patent document 1: IEEE 802.11 Std. "11.1.3.1 Passive scanning", "11.1.3.2 Active scanning"

DISCLOSURE

Problems to be Solved

However, since the STA in the existing scan method continuously performs the AP scan even when no AP exists in the neighborhood and there is no possibility of connection to an AP, the STA uselessly consumes power, resulting in a short battery lifetime of the STA. In particular, as compared to when the STA is monitoring to the channel as in passive scanning, when active scanning is performed, the power of the STA is significantly consumed since the STA transmits a probe request.

To solve this problem, there is a method by which the AP scan intervals are uniformly lengthened. However, uniformly lengthening the AP scan intervals makes longer the time that elapses before the STA finds an AP, performs connection processing, and starts communication, thus, results in an increase in delay.

Incidentally, as in a case where a STA connected to an AP of a home wireless LAN, for example, is taken out of the house, when it is presumed that, based on the information on the AP to which the STA being connected just before disconnection, the possibility of connection to an AP while the STA is being carried from home to an AP of a public wireless LAN spot or an office, for example, is low, an increase in delay rarely becomes a problem even when the AP scan interval is lengthened. Instead, a longer scan interval creates the big advantage of reducing power consumption. Likewise, when it is presumed that, based on the information on the application which being running in the STA just before the STA being disconnected from the AP, the need for immediate connection to an AP is small as in receiving mails, for example, the AP scan interval may be lengthened.

On the other hand, when the possibility of connection to an AP is high or the need for connection is great, by making the AP scan interval shorter, an increase in delay can be avoided. Furthermore, since there is a high possibility that the STA connects to an AP in a short time, the power is not uselessly consumed.

Based on such findings, the present application proposes to provide an AP scan method, a scan program, and a STA that can, when a STA disconnected from the AP scans for a next AP to which the STA can be connected, prevent a delay increase when the possibility of connection to an AP is high or the need for connection is great, and reduce power consumption due to unnecessary scanning when the possibility of connection to an AP is low or the need for connection is small.

Means for Solving the Problems

According to the first aspect of the present invention, in an AP scan method by which a STA disconnected from an AP scans for a next AP to which the STA can be connected at a predetermined scan interval, the STA sets a shorter scan interval when a possibility of connection to the next AP to which the STA can be connected is presumed to be high or a need for connection is presumed to be great, and sets a longer scan interval when the possibility of connection is presumed to be low or the need for connection is presumed to be small, based on information on the AP to which the STA being connected just before disconnection or information on the STA.

In the first aspect, the information on the AP to which the STA being connected just before the disconnection or the information on the STA is any one of Service Set Identifier (SSID) information of the AP, information on a network address of a subnet of an IP address assigned to the STA, information on an application of a STA which being running just before the disconnection, service area information of a STA with a cellular phone function, information on a reception level of the STA with the cellular phone function, and information on communication quality of the STA with the cellular phone function.

In the first aspect, the scan interval is changed dynamically according to number of scans.

According to the second aspect of the present invention, in a STA including a scanning section scanning for a next AP to which the STA can be connected at a predetermined scan interval when the STA is disconnected from an AP, the scanning section includes a scan interval table relating the information on the AP to which the STA being connected just before the disconnection or the information on the STA to the scan interval in such a way that the scan interval is shortened when a possibility of connection to the next AP to which the STA can be connected is presumed to be high or a need for connection is presumed to be great, and the scan interval is lengthened when the possibility of connection is presumed to be low or the need for connection is presumed to be small, based on the information on the AP to which the STA being connected just before the disconnection or the information on the STA, and a scanning management section setting the scan interval, when the STA is disconnected from the AP, by referring to the scan interval table based on the information on the AP to which the STA being connected just before the disconnection or the information on the STA.

In the second aspect, the information on the AP to which the STA being connected just before the disconnection or the information on the STA to be set in the scan interval table is any one of SSID information of the AP, information on a network address of a subnet of an IP address assigned to the STA, information on an application of a STA which being running just before the disconnection, service area information of a STA with a cellular phone function, information on a reception level of the STA with the cellular phone function, and information on communication quality of the STA with the cellular phone function.

In the second aspect, the scan interval set in the scan interval table is changed dynamically according to number of scans.

According to the third aspect of the present invention, in a non-transitory computer readable medium having stored thereon computer executable instructions for a scan program by which a STA disconnected from an AP scans for a next AP to which the STA can be connected at a predetermined scan interval, the scan program has a scan interval table relating the information on the AP to which the STA being connected just before the disconnection or the information on the STA to the scan interval in such a way that the scan interval is shortened when a possibility of connection to the next AP to which the STA can be connected is presumed to be high or a need for connection is presumed to be great, and the scan interval is lengthened when the possibility of connection is presumed to be low or the need for connection is presumed to be small, based on the information on the AP to which the STA being connected just before the disconnection or the information on the STA, and the scan program comprising a first step obtaining the information on the AP to which the STA being connected just before the disconnection or the information on the STA when the STA is disconnected from the AP, and a second step setting the scan interval by referring to the scan interval table based on the information obtained in the first step.

In the third aspect, the information on the AP to which the STA being connected just before the disconnection or the information on the STA to be set in the scan interval table is any one of SSID information of the AP, information on a network address of a subnet of an IP address assigned to the STA, information on an application of a STA which being running just before the disconnection, service area information of a STA with a cellular phone function, information on a reception level of the STA with the cellular phone function, and information on communication quality of the STA with the cellular phone function.

In the third aspect, the scan interval set in the scan interval table is changed dynamically according to number of scans, and the second step counts the number of scans and sets a scan interval according to number of scans by referring to the scan interval table.

According to the present invention, it is possible to prevent delay and power consumption from increasing due to unnecessary scanning by estimating the possibility of connection to an AP or the need for connection based on information on the AP to which a STA being connected just before disconnection and information on the STA and setting an AP scan interval corresponding to the possibility of connection or the need for connection. Furthermore, when scanning is repeatedly performed because a connectable AP cannot be found, the scan interval is changed dynamically according to the number of scans, whereby it is possible to prevent power consumption from increasing due to unnecessary scanning.

DETAILED DESCRIPTION OF THE EMBODIMENTS

Hereinafter, embodiments of the present invention will be described in detail with reference to the drawings.

Incidentally, in all drawings for describing the embodiments, those elements which have the identical function are identified with the same reference numerals, and their explanations are not repeated.

Embodiment 1

Figure 4:
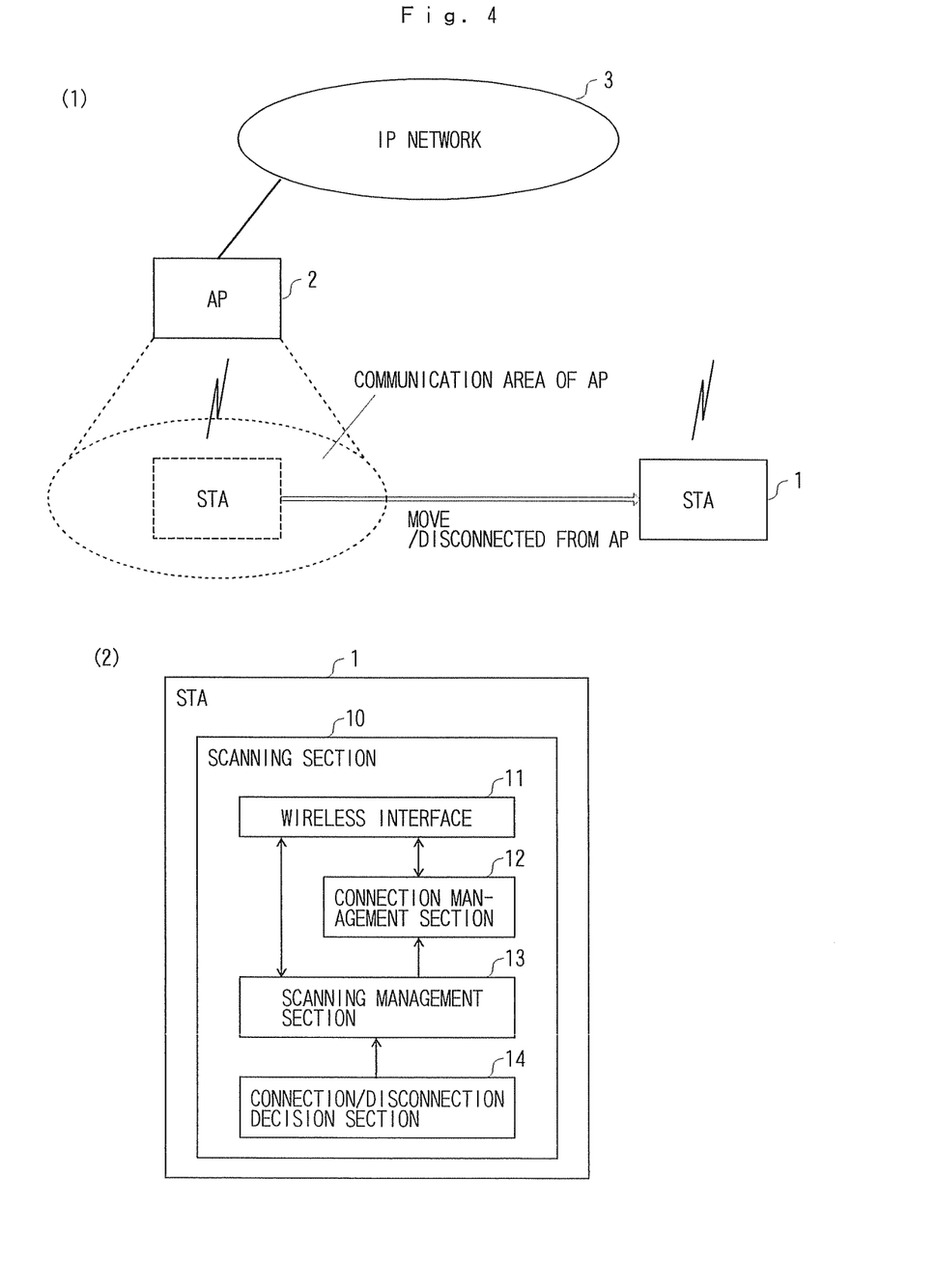
FIG. 4 is block diagrams showing an overall configuration of a wireless LAN system to which each embodiment of the present invention is applied and an example of a configuration of a STA according to the present invention.

FIG. 4 is a block diagram showing the overall configuration of a wireless LAN system to which each embodiment of the present invention is applied and an example of a configuration of a STA according to the present invention.

In FIG. 4(1), an AP 2 of the wireless LAN system provides a plurality of STA 1 within a service area, and connects the STA 1 to an IP network 3. Within the service area of the AP 2, the STA 1 connects to the AP 2 and communicates with the IP network 3 via the AP 2. Outside the service area, the STA 1 scans for a connectable AP.

In FIG. 4(2), the STA 1 includes a scanning section 10, and the scanning section 10 includes a wireless interface 11, a connection management section 12, a scanning management section 13, and a connection/disconnection decision section 14.

The connection/disconnection decision section 14 decides whether the STA 1 is connected to the AP 2. When the STA 1 is found to be disconnected, the connection/disconnection decision section 14 notifies the scanning management section 13 of the disconnection. The scanning management section 13 determines an AP 2 scan interval, and manages the wireless interface 11 according to the scan interval thus determined. In accordance with IEEE 802.11 Std., the connection management section 12 performs processing to establish connection to the AP 2. The wireless interface 11 transmits and receives a frame in a wireless medium.

Figure 5:
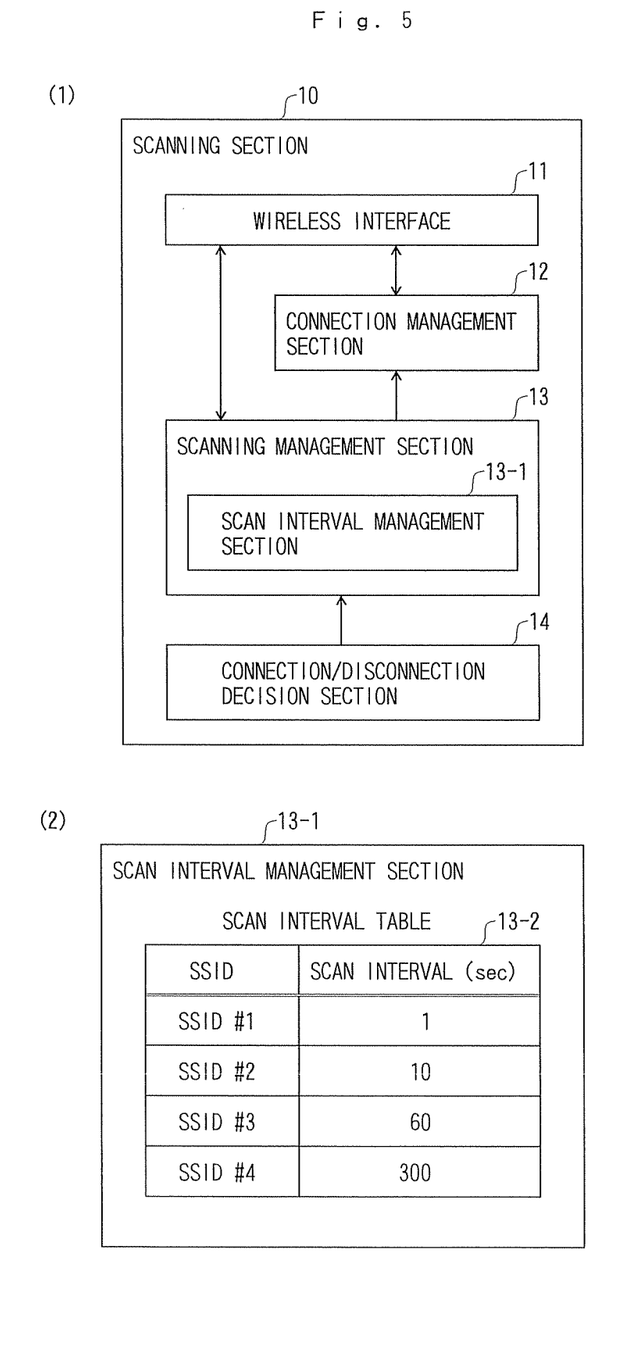
FIG. 5 is block diagrams showing a configuration of a scanning management section 13 of a scanning section 10.

FIG. 5 is a block diagram showing an example of a configuration of the scanning management section 13 of the scanning section 10.

In FIGS. 5(1) and (2), the scanning management section 13 includes a scan interval management section 13-1, and the scan interval management section 13-1 includes scan interval table 13-2. When the information indicating that the STA has been disconnected from the AP is obtained from the connection/disconnection decision section 14, the scanning management section 13 refers to scan interval table 13-2 of the scan interval management section 13-1, and determines a scan interval corresponding to the SSID of the AP to which the STA being connected just before disconnection. The scanning management section 13 performs AP scan processing using active scanning or passive scanning at the scan interval thus determined.

When the scanning management section 13 finds an AP, the scanning management section 13 instructs the connection management section 12 to start connection. When an instruction to start connection is received from the scanning management section 13, the connection management section 12 performs processing, in accordance with IEEE 802.11 Std., to establish connection to the AP.

Scan interval table 13-2 shown in FIG. 5(2) is a table relating the SSID of an AP to the scan interval. Here, it is assumed that the possibility of connection to an AP or the need for connection is reduced in the order of SSID#1 to SSID#4. For example, it is assumed that the SSID#1 is an AP of an office 1, the SSID#2 is an AP of an office 2, the SSID#3 is an AP of a public wireless LAN spot, and the SSID#4 is an AP of a home.

In scan interval table 13-2 shown in FIG. 5(2), when the SSID of the AP to which the STA being connected just before disconnection is the SSID#1, it is presumed that there are a large number of APs around because the AP is the AP of the office 1 and the possibility of connection is high or the need for connection is great, and an AP scan is performed at intervals of 1 second. Likewise, when the SSID of the AP to which the STA being connected just before disconnection is the SSID#2, an AP scan is performed at intervals of 10 seconds, and, when the SSID of the AP to which the STA being connected just before disconnection is the SSID#3, an AP scan is performed at intervals of 60 seconds. Furthermore, when the SSID of the AP to which the STA being connected just before disconnection is the SSID#4, it is presumed that the STA has been taken out of the house because the AP is the AP of the home, there are few APs around, and the possibility of connection is low or the need for connection is small, and an AP scan is performed at intervals of 300 seconds.

Figure 6:
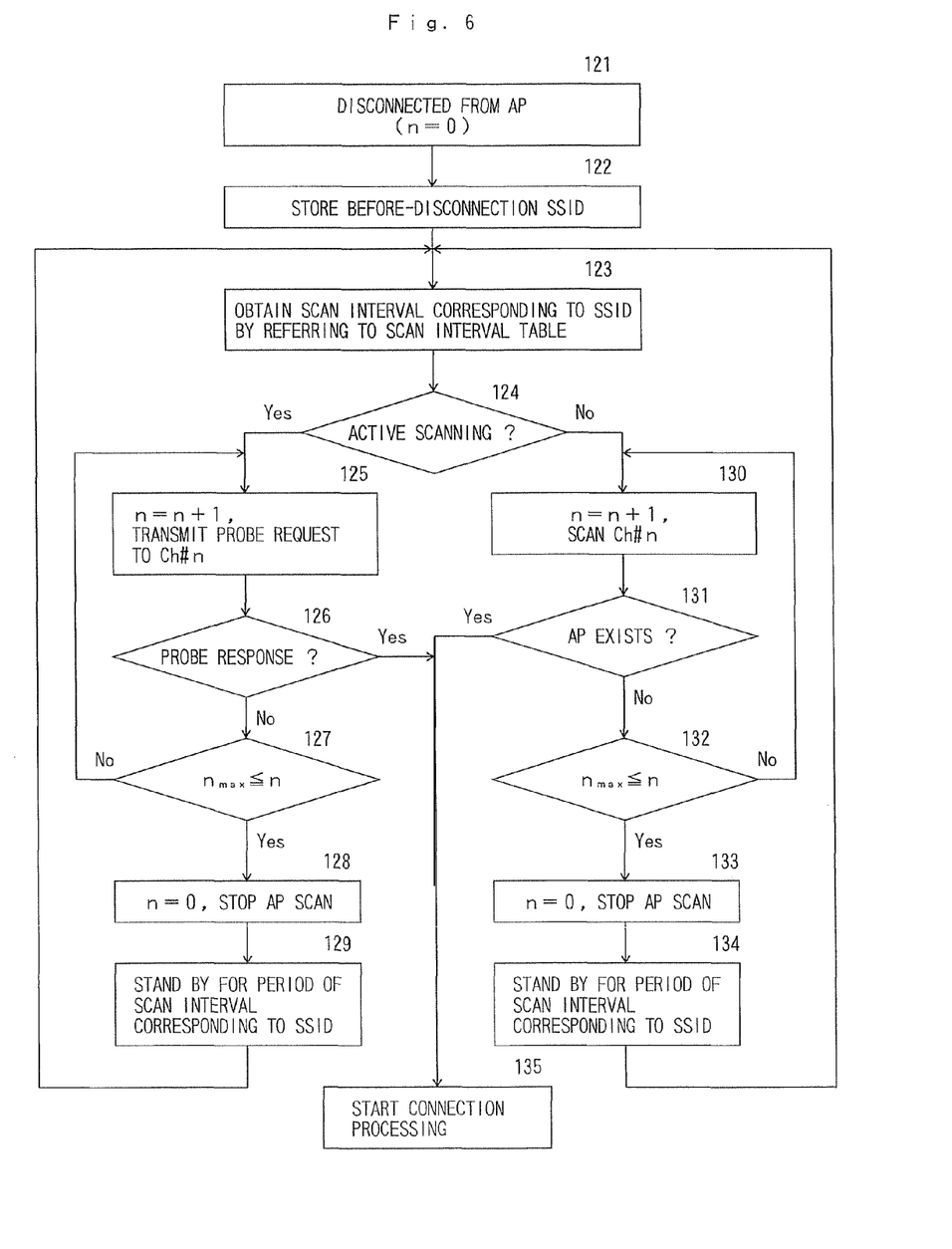
FIG. 6 is a flowchart showing a procedure of an AP scan in the STA of embodiment 1.

FIG. 6 is a flowchart showing a procedure of an AP scan in the STA of embodiment 1. Incidentally, in FIG. 6, the initial value of a channel number n is 0, and $n_{max}$ is the maximum value of the channel number.

First, when the STA is disconnected from the AP (step 121), the STA stores the before-disconnection SSID (step 122). Next, based on the information on the before-disconnection SSID of the AP, the STA refers to scan interval table 13-2 shown in FIG. 5(2), and obtains a scan interval corresponding to the SSID (step 123).

Next, the STA decides between active scanning and passive scanning (step 124). When active scanning is performed, the STA adds 1 to n, and transmits probe requests sequentially to Ch#1 to Ch#$n_{max}$ (step 125 to step 127). When a connectable AP exists in any one of Ch#1 to Ch#$n_{max}$ and a probe response is sent back from the AP ("Yes" in step 126), the STA starts processing to establish connection to the AP using the channel (step 135).

When no connectable AP is found to exist after the STA transmits the probe requests sequentially to Ch#1 to Ch#$n_{max}$, the STA resets n to 0, stops the AP scan (step 128), is on standby for the period of the scan interval which is obtained from scan interval table 13-2 and is corresponding to the SSID (step 129), goes back to step 123, and repeats the AP scan until the STA connects to an AP.

When passive scanning is performed, the STA adds 1 to n, and sequentially scans Ch#1 to Ch#$n_{max}$ (step 130 to step 132). When a connectable AP exists in any one of Ch#1 to Ch#$n_{max}$ ("Yes" in step 131), the STA starts processing to establish connection to the AP using the channel (step 135).

When no connectable AP is found to exist after the STA sequentially scans Ch#1 to Ch#$n_{max}$, the STA resets n to 0, stops the AP scan (step 133), is on standby for the period of the scan interval which is obtained from scan interval table 13-2 and is corresponding to the SSID (step 134), goes back to step 123, and repeats the AP scan until the STA connects to an AP.

Figure 7:
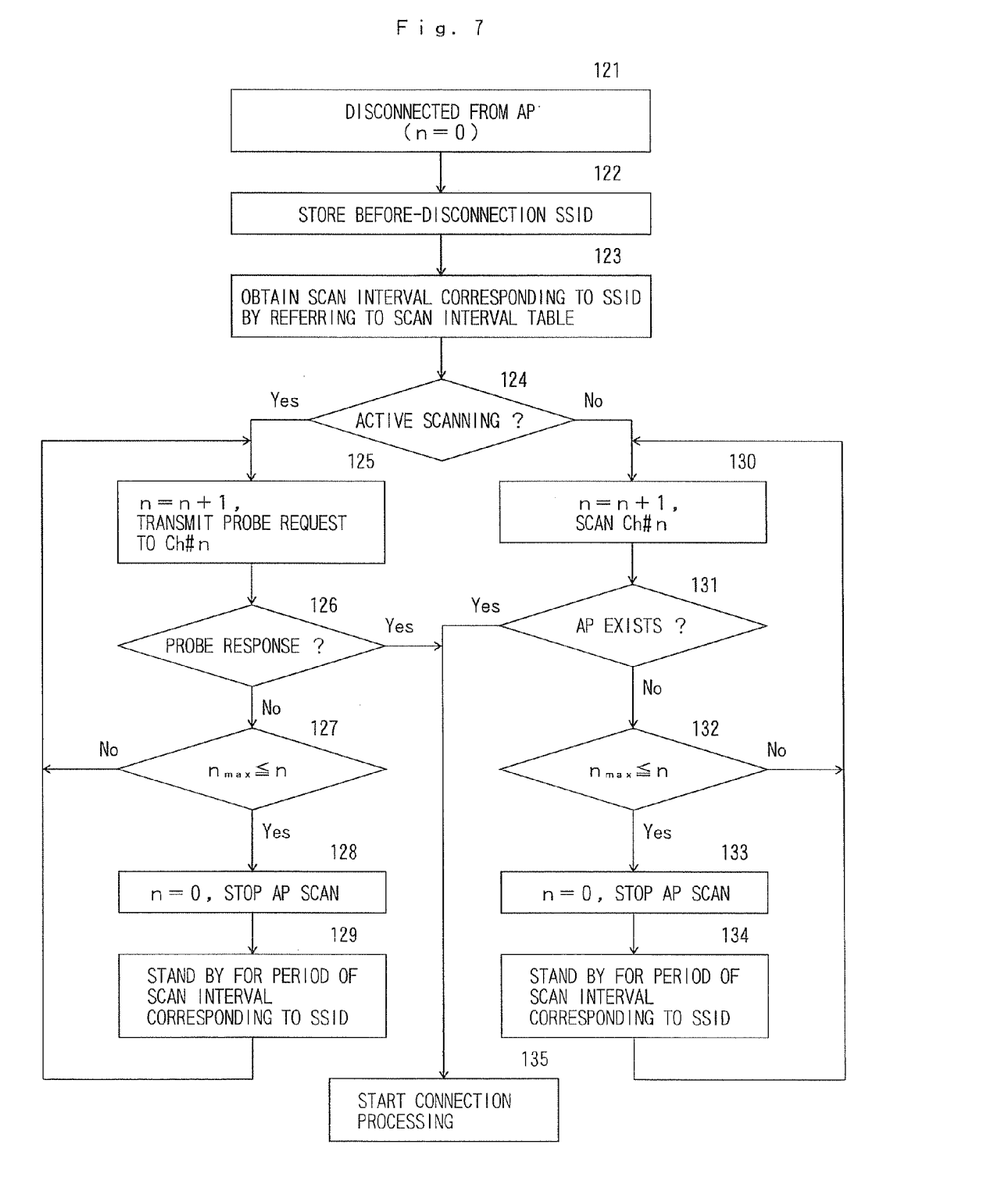
FIG. 7 is a flowchart showing another example of the procedure of an AP scan in the STA of embodiment 1.

FIG. 7 is a flowchart showing another example of the procedure of an AP scan in the STA of embodiment 1. In this procedure, a step to which the procedure goes back in steps 129 and 134 in the procedure of FIG. 6 after the STA is on standby for the period of the scan interval which is obtained from scan interval table 13-2 and is corresponding to the SSID, is changed from step 123 to steps 125 and 130. Other processing is the same as that of the procedure of FIG. 6.

Embodiment 2

Embodiment 2 allows the scan interval of scan interval table 13-2 to be changed dynamically according to the number m of scans.

Figure 8:
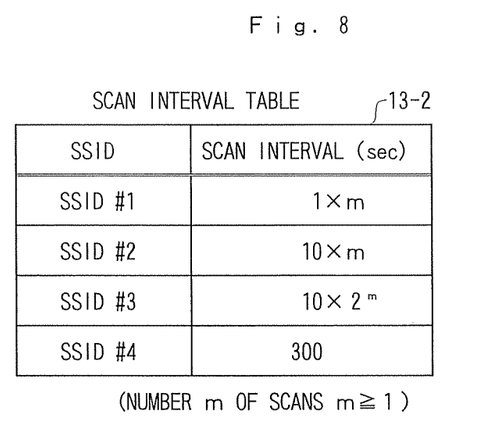
FIG. 8 is a diagram showing the contents of scan interval table 13-2 of embodiment 2.
Figure 9:
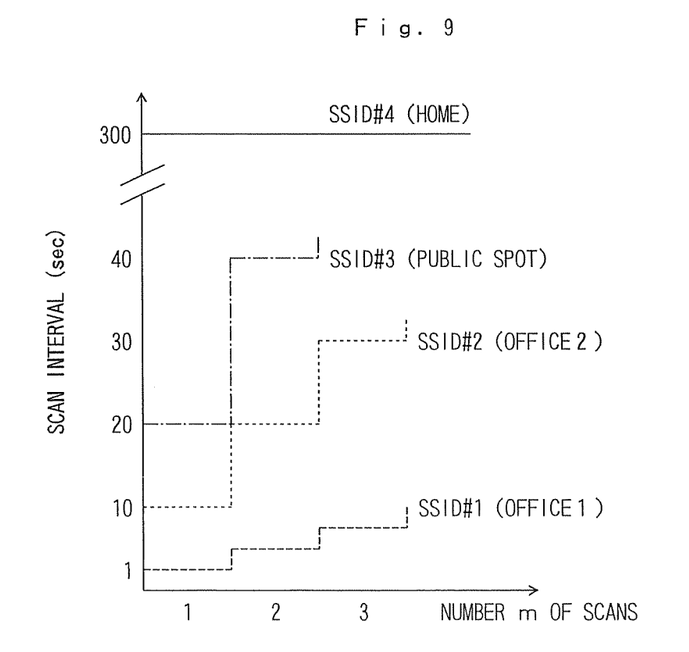
FIG. 9 is a graph showing the AP scan intervals in embodiment 2.

FIG. 8 is a diagram showing the contents of scan interval table 13-2 of embodiment 2. FIG. 9 is a graph showing the AP scan intervals in embodiment 2.

In FIG. 8, m is an integer equal to or greater than 1, and m=1 is the first scanning by which all channels are scanned. The scan interval for the SSID#1 is (1×m). As shown in FIG. 9, the scan interval for the SSID#1 starts from 1 second, and the scan interval becomes 2 seconds, 3 seconds, and subsequent period of time with an increase in the number m of scans.

The scan interval corresponding to the SSID#2 is (10×m). As shown in FIG. 9, the scan interval for the SSID#2 starts from 10 seconds, and the scan interval becomes 20 seconds, 30 seconds, and subsequent period of time with an increase in the number m of scans.

Further, the scan interval corresponding to the SSID#3 is $(10\times 2^m)$. As shown in FIG. 9, the scan interval for the SSID#3 starts from 20 seconds, and the scan interval exponentially increases and becomes 40 seconds, 80 seconds, and subsequent period of time with an increase in the number m of scans.

Furthermore, the scan interval for the SSID#4 is 300 seconds, and, as shown in FIG. 9, the SSID#4 has a fixed scan interval irrespective of the number m of scans.

As described above, in this embodiment, the scan interval increases according to the number m of scans until an AP is found, and the SSIDs of APs have different rates of increase of the scan interval. Here, for example, in an environment (SSID#1) of the office 1, since the probability of the existence of a neighboring AP is high after disconnection from the AP, the rate of increase of the scan interval is low. By contrast, in the public wireless LAN spot (SSID#3), since the probability of the existence of a neighboring AP is low, the rate of increase of the scan interval is high.

Figure 10:
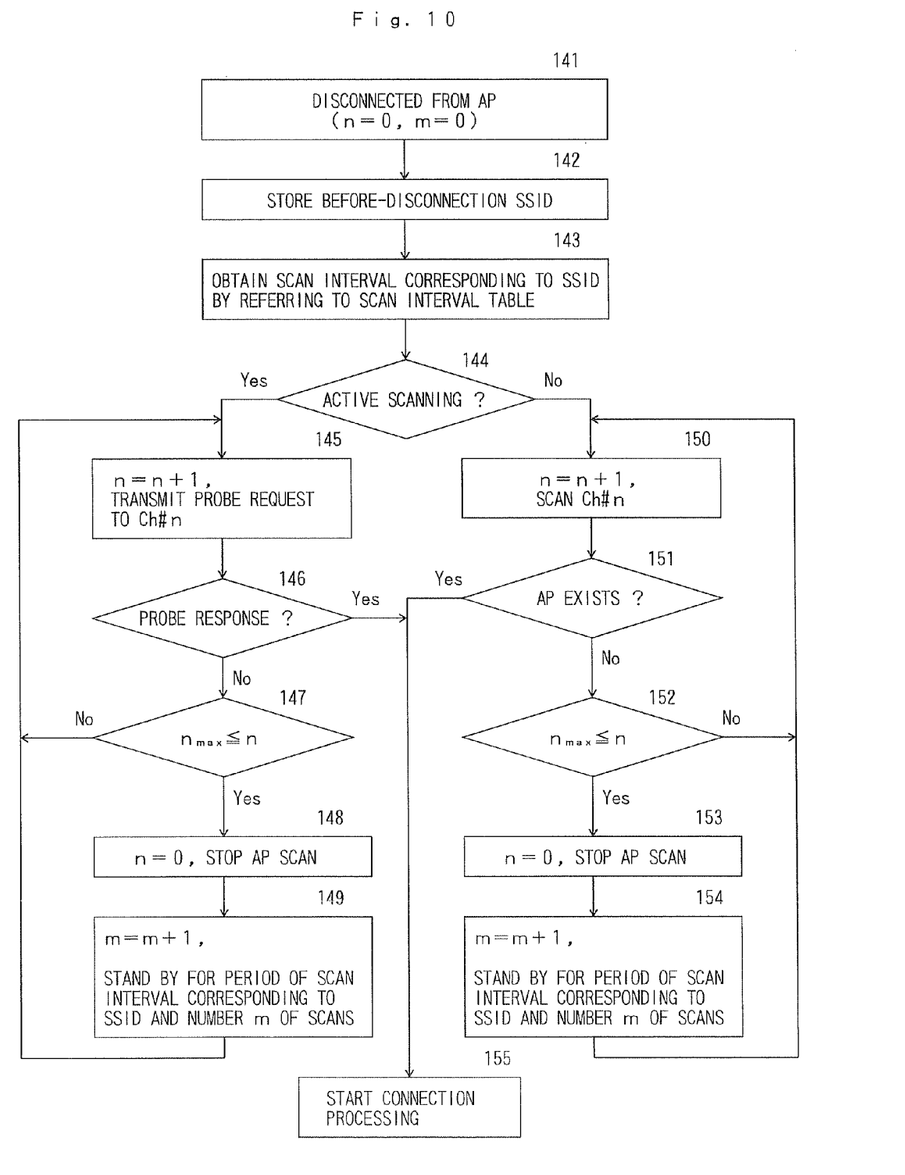
FIG. 10 is a flowchart showing the procedure of an AP scan in the STA of embodiment 2.

FIG. 10 is a flowchart showing a procedure of an AP scan in the STA of embodiment 2. Incidentally, in FIG. 10, the initial value of a channel number n is 0, and $n_{max}$ is the maximum value of the channel number. Furthermore, the initial value of the number m of scans is 0.

First, when the STA is disconnected from the AP (step 141), the STA stores the before-disconnection SSID (step 142). Next, based on the information on the before-disconnection SSID of the AP, the STA refers to scan interval table 13-2 shown in FIG. 8, and obtains a scan interval corresponding to the SSID (step 143). Incidentally, the scan interval obtained here corresponds to the SSID, and is a function or a constant of the number m of scans.

Next, the STA decides between active scanning and passive scanning (step 144). When active scanning is performed, the STA adds 1 to n, and transmits probe requests sequentially to Ch#1 to Ch#$n_{max}$ (step 145 to step 147). When a connectable AP exists in any one of Ch#1 to Ch#$n_{max}$ and a probe response is sent back from the AP ("Yes" in step 146), the STA starts processing to establish connection to the AP using the channel (step 155).

When no connectable AP is found to exist after the STA transmits the probe requests sequentially to Ch#1 to Ch#$n_{max}$, the STA resets n to 0, stops the AP scan (step 148), adds 1 to m, is on standby for the period of the scan interval which is obtained from scan interval table 13-2 and is corresponding to the SSID and the number m of scans (step 149), goes back to step 145, and repeats the AP scan until the STA connects to an AP.

When passive scanning is performed, the STA adds 1 to n, and sequentially scans Ch#1 to Ch#$n_{max}$ (step 150 to step 152). When a connectable AP exists in any one of Ch#1 to Ch#$n_{max}$ ("Yes" in step 151), the STA starts processing to establish connection to the AP using the channel (step 155).

When no connectable AP is found to exist after the STA sequentially scans Ch#1 to Ch#$n_{max}$, the STA resets n to 0, stops the AP scan (step 153), adds 1 to m, is on standby for the period of the scan interval which is obtained from scan interval table 13-2 and is corresponding to the SSID and the number m of scans (step 154), goes back to step 150, and repeats the AP scan until the STA connects to an AP.

Embodiment 3

Embodiment 3 uses scan interval table 13-2 relating a network address of a subnet of an IP address assigned to a STA to the scan interval.

Figure 11:
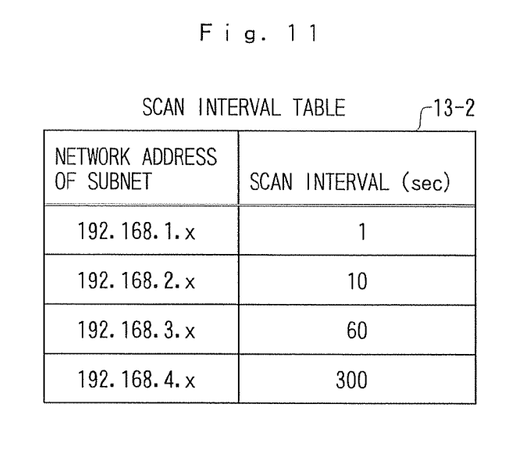
FIG. 11 is a diagram showing the contents of scan interval table 13-2 of embodiment 3.

FIG. 11 is a diagram showing the contents of scan interval table 13-2 of embodiment 3. In FIG. 11, scan interval table 13-2 relates a network address of a subnet of an IP address assigned to a STA to the scan interval. The STA refers to scan interval table 13-2 shown in FIG. 11 based on the network address of the subnet of the IP address. That is, in this processing, the SSID in the procedure shown in FIGS. 6 and 7 is replaced by the network address of the subnet of the IP address assigned to the STA.

Scan interval table 13-2 shown in FIG. 11 shows that the scan interval for a network address of a subnet 192.168.1.x is 1 second, the scan interval for a network address of a subnet 192.168.2.x is 10 seconds, the scan interval for a network address of a subnet 192.168.3.x is 60 seconds, and the scan interval for a network address of a subnet 192.168.4.x is 300 seconds. The IP address of the STA can be used when an IP address which depends on the location of an AP is assigned by a service provider or an administrator of the AP, and the scan interval is set according to a usage situation in which the AP is installed in an office, a public wireless LAN spot, or the like.

Incidentally, also in this embodiment, as in embodiment 2 shown in FIGS. 8 to 10, the scan interval of scan interval table 13-2 may be changed dynamically according to the number m of scans.

Embodiment 4

Embodiment 4 uses scan interval table 13-2 relating the cellular service area information to the scan interval when a STA has both a wireless LAN and a cellular phone (cellular) function.

Figure 12:
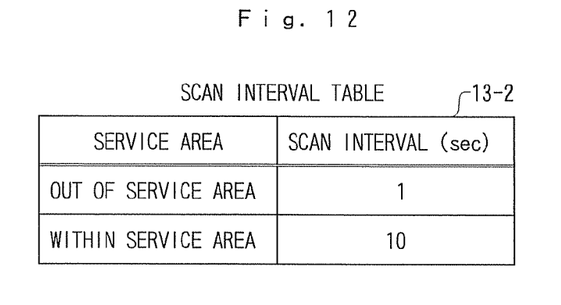
FIG. 12 is a diagram showing the contents of scan interval table 13-2 of embodiment 4.

FIG. 12 is a diagram showing the contents of scan interval table 13-2 of embodiment 4. In FIG. 12, scan interval table 13-2 relates the cellular service area information to the scan interval. When a STA is disconnected from the AP, the STA refers to scan interval table 13-2 shown in FIG. 12 based on the cellular service area information. That is, in this processing, the SSID in the procedure shown in FIGS. 6 and 7 is replaced by the cellular service area information.

Scan interval table 13-2 shown in FIG. 12 shows that, outside the service area, scanning is performed at scan intervals of 1 second, and, within the service area, scanning is performed at scan intervals of 10 seconds. Here, the cellular service area information is used for the purpose of maintaining cellular or wireless LAN communication by actively scanning for an AP in the wireless LAN system outside the service area where cellular communication is impossible. That is, when the need for connection to an AP is great outside the cellular service area, the scan interval is shortened, and when the need for connection to an AP is small within the cellular service area, the scan interval is lengthened.

Incidentally, in addition to producing a decision about the service area based on the presence or absence of connection to a cellular base station, when the reception level or the communication quality is found to fall below a predetermined threshold value by referring to the cellular reception level or the communication quality such as a bit error rate, the STA may assume itself to be out of a service area, and may set a corresponding scan interval. As a result, the STA judges itself to be out of service area at the time of which the cellular reception level or the communication quality decreases, and makes the AP scan interval shorter, and thereby the STA can shorten the period during which communication is impossible, when the STA is disconnected from the AP and performs a next AP scan.

Furthermore, also in this embodiment, as in embodiment 2 shown in FIGS. 8 to 10, the scan interval of scan interval table 13-2 may be changed dynamically according to the number m of scans.

Embodiment 5

Embodiment 5 uses scan interval table 13-2 relating the information on the application which being running in the STA just before the STA being disconnected from the AP to the scan interval.

Figure 13:
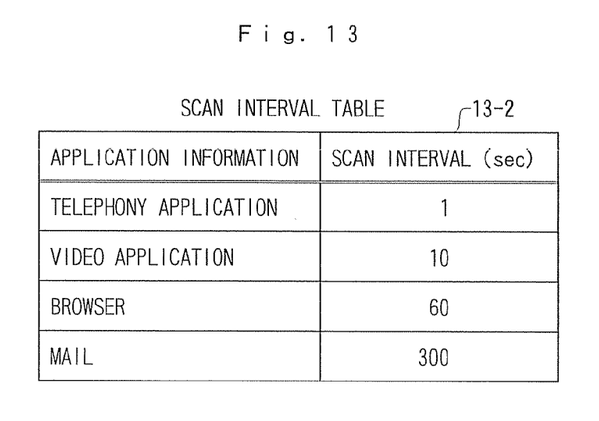
FIG. 13 is a diagram showing the contents of scan interval table 13-2 of embodiment 5.

FIG. 13 is a diagram showing the contents of scan interval table 13-2 of embodiment 5. In FIG. 13, scan interval table 13-2 raltes the application information to the scan interval. Whan a STA is disconnected from the AP, the STA refers to scan interval table 13-2 shown in FIG. 13 based on the information on the application which being running just before disconnection. That is, in this processing, the SSID in the procedure shown in FIGS. 6 and 7 is replaced by the information on the application which being running in the STA just before the disconnection.

Scan interval table 13-2 shown in FIG. 13 shows that the scan interval for telephony application is 1 second, the scan interval for video application is 10 seconds, the scan interval for a browser is 60 seconds, and the scan interval for mail is 300 seconds.

Here, the telephony application is assumed to be an IP telephone or the like, the video application is assumed to be a TV telephone, streaming service application, or the like, the browser is assumed to be a Web browser, etc., and the mail is assumed to be electronic mail. In this embodiment, when the telephony application, for example, is frequently used, since there are incoming calls, a shorter scan interval is set to perform an AP scan actively, and for application such as mail, which is less affected by the occurrence of delay in reception, a longer scan interval is set.

Incidentally, also in this embodiment, as in embodiment 2 shown in FIGS. 8 to 10, the scan interval of scan interval table 13-2 may be changed dynamically according to the number m of scans.

Embodiment 6

The operation flows shown in FIGS. 6, 7, and 10 can be realized by each piece of hardware in the scanning section 10 shown in FIG. 4. In addition to that, it is also possible to store the steps forming these operation flows in a ROM or the like in advance as a scan program, and cause a CPU which is a computer to read and execute the program.

As described above, in the embodiments, it is possible to estimate the possibility of connection to an AP 2 or the need for connection based on the information on the AP 2 to which the STA 1 being connected just before disconnection or the information on the STA 1, and set an AP scan interval corresponding to the possibility of connection or the need for connection. This makes it possible to prevent delay and power consumption from increasing due to unnecessary scanning when the STA 1 scans for a next AP 2 to which the STA 1 can be connected.

Furthermore, when scanning is repeatedly performed because a connectable AP 2 cannot be found and it is presumed that the possibility of connection to an AP 2 is low with an increase in the number m of scans, the scan interval is changed dynamically according to the number m of scans, whereby it is possible to prevent power consumption from increasing due to unnecessary scanning.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An access point scan method by which a station disconnected from an access point scans for a next access point to which the station can be connected at a predetermined scan interval, the method comprising:

storing, at the station, a scan interval table that relates a plurality of different access points with look-up data for each of said plurality of different access points indicating a degree to which the possibility of connection with the next access point exists or a degree to which the need for connection to a next access point exists, setting, at the station, the predetermined scan interval to be a first scan interval when the possibility of connection to the next access point to which the station can be connected is presumed to be at a first level or a need for connection is presumed to be at the first level, and a second scan interval when the possibility of connection is presumed to be at a second level or the need for connection is presumed to be at the second level, based on information on the access point to which the station being connected just before disconnection or on information on the station, wherein the first level is higher than the second level and the first scan interval is shorter than the second scan interval; and wherein said information on the station includes information on an application running on said station just before disconnection;

wherein, at the station, initiating a counter and actively or passively scanning each of a plurality of channels to determine existence of a connectable access point on any one of the plurality of channels;

wherein, in response to determining that the connectable access point exists, establishing a connection to the connectable access point and in response to determining that the connectable access point does not exist, resetting the counter and waiting for a time equal to the predetermined scan interval;

repeating said initiating and said actively or said passively scanning; and wherein, said actively scanning comprises transmitting a probe request on each of the plurality of channels and said passively scanning comprises monitoring a beacon.

2. The access point scan method according to claim 1, wherein one of the information on the access point to which the station being connected just before the disconnection and the information on the station further includes any one of SSID (Service Set Identifier) information of the access point, information on a network address of a subnet of an IP address assigned to the station, service area information of a station with a cellular phone function, information on a reception level of the station with the cellular phone function, and information on communication quality of the station with the cellular phone function.

3. The access point scan method according to claim 1, wherein the scan interval is changed dynamically according to a number of scans.

4. A station comprising:
a central processing unit (CPU);
the CPU configured to perform:
scanning for a next access point to which the station can be connected at a predetermined scan interval when the station is disconnected from an access point,
storing, at the station, a scan interval table prestored in memory disposed within the station and which relates a plurality of different access points with look-up data for each of said plurality of different access points indicating a degree to which the possibility of connection with the next access point exists or a degree to which the need for connection to a next access point exists;
setting, at the station, the predetermined scan interval to be a first scan interval when the possibility of connection to the next access point to which the station can be connected is presumed to be at a first level or a need for connection is presumed to be at the first level, and a second scan interval when the possibility of connection is presumed to be at a second level or the need for connection is presumed to be at the second level, based on information on the access point to which the station being connected just before disconnection or on information on the station, wherein the first level is higher than the second level and the first scan interval is shorter than the second scan interval; and
wherein said information on the station includes information on an application running on said station just before disconnection;
wherein, at the station, initiating a counter and actively or passively scanning each of a plurality of channels to determine existence of a connectable access point on any one of the plurality of channels;
wherein, in response to determining that the connectable access point exists, establishing a connection to the connectable access point and in response to determining that the connectable access point does not exist, resetting the counter and waiting for a time equal to the predetermined scan interval;

repeating said initiating and said actively or said passively scanning; and wherein, said actively scanning comprises transmitting a probe request on each of the plurality of channels and said passively scanning comprises monitoring a beacon.

5. The station according to claim 4, wherein one of the information on the access point to which the station being connected just before the disconnection and the information on the station to be set in the scan interval table further includes any one of SSID (Service Set Identifier) information of the access point, information on a network address of a subnet of an IP address assigned to the station, service area information of a station with a cellular phone function, information on a reception level of the station with the cellular phone function, and information on communication quality of the station with the cellular phone function.

6. The station according to claim 4, wherein
the scan interval set in the scan interval table is changed dynamically according to a number of scans.

7. A non-transitory computer readable medium having stored thereon computer executable instructions for a scan program by which a station disconnected from an access point scans for a next access point to which the station can be connected at a predetermined scan interval, the computer executable instructions cause the computer to perform:
storing, at the station, a scan interval table that relates a plurality of different access points with look-up data for each of said plurality of different access points indicating a degree to which the possibility of connection with the next access point exists or a degree to which the need for connection to a next access point exists,
setting, at the station, the predetermined scan interval to be a first scan interval when the possibility of connection to the next access point to which the station can be connected is presumed to be at a first level or a need for connection is presumed to be at the first level, and a second scan interval when the possibility of connection is presumed to be at a second level or the need for connection is presumed to be at the second level, based on information on the access point to which the station being connected just before disconnection or on information on the station, wherein the first level is higher than the second level and the first scan interval is shorter than the second scan interval; and
wherein said information on the station includes information on an application running on said station just before disconnection;
wherein, at the station, initiating a counter and actively or passively scanning each of a plurality of channels to determine existence of a connectable access point on any one of the plurality of channels;
wherein, in response to determining that the connectable access point exists, establishing a connection to the connectable access point and in response to determining that the connectable access point does not exist, resetting the counter and waiting for a time equal to the predetermined scan interval;
repeating said initiating and said actively or said passively scanning; and
wherein, said actively scanning comprises transmitting a probe request on each of the plurality of channels and said passively scanning comprises monitoring a beacon.

8. The non-transitory computer readable medium according to claim 7, wherein one of the information on the access point to which the station being connected just before the disconnection and the information on the station to be set in the scan interval table further includes any one of SSID (Service Set Identifier) information of the access point, information on a network address of a subnet of an IP address assigned to the station, service area information of a station with a cellular phone function, information on a reception level of the station with the cellular phone function, and information on communication quality of the station with the cellular phone function.

9. The non-transitory computer readable medium according to claim 7, wherein the computer executable instructions are further for:

dynamically changing the scan interval set in the scan interval table according to a number of scans, counting the number of scans and setting a scan interval according to number of scans by referring to the scan interval table.

* * * * *